United States Patent
Van Walraven et al.

(10) Patent No.: US 9,011,059 B2
(45) Date of Patent: Apr. 21, 2015

(54) FASTENING UNIT

(75) Inventors: Jan Van Walraven, Mijdrecht (NL); Marek Juzak, Mijdrecht (NL)

(73) Assignee: J. Van Walraven Holdings B.V., Mijdrecht (NL)

( * ) Notice: Subject to any disclaimer, the term of this patent is extended or adjusted under 35 U.S.C. 154(b) by 106 days.

(21) Appl. No.: 13/698,656

(22) PCT Filed: May 26, 2011

(86) PCT No.: PCT/NL2011/050363
§ 371 (c)(1),
(2), (4) Date: Nov. 18, 2012

(87) PCT Pub. No.: WO2011/152714
PCT Pub. Date: Dec. 8, 2011

(65) Prior Publication Data
US 2013/0064623 A1     Mar. 14, 2013

(30) Foreign Application Priority Data

Jun. 3, 2010  (NL) ...................................... 2004811

(51) Int. Cl.
*F16B 37/04*     (2006.01)
(52) U.S. Cl.
CPC .................................... *F16B 37/046* (2013.01)
(58) Field of Classification Search
USPC .............................. 411/84, 85, 112, 104, 552
See application file for complete search history.

(56) References Cited

U.S. PATENT DOCUMENTS 4,146,074 A * 3/1979 Kowalski ....................... 411/111
4,285,379 A * 8/1981 Kowalski ......................... 411/85

(Continued)

FOREIGN PATENT DOCUMENTS

| EP | 0775838 A1 | 5/1997 |
| EP | 0978663 A1 | 2/2000 |
| EP | 1036950 A1 | 9/2000 |
| EP | 1876362 A1 | 1/2008 |
| WO | 2007008060 A1 | 1/2007 |

OTHER PUBLICATIONS

International Search Report dated Aug. 31, 2011 for priority PCT/NL2011/050363.

(Continued)

*Primary Examiner* — Flemming Saether
(74) *Attorney, Agent, or Firm* — Troutman Sanders LLP; Ryan A. Schneider; Daniel T. Sharpe

(57) ABSTRACT

A fastening unit (1,101) for fastening an object to a profile element (80) with a longitudinal slot (85). The profile element having an upper side formed by a flanges which define between them the longitudinal slot. The fastening unit includes an oblong metal anchoring element (2) for engaging behind the flanges, a washer element (4) for engaging the upper side of the flanges and a support element. The support element (3) is connected to the anchoring element and associated with the washer element. The connection between the support element and the anchoring element includes two or more connecting legs (36) which are formed integrally with a body of the support element and extend each through an associated recess in the anchoring element. The connecting legs at their distal ends have a retaining lug (37) for preventing that the anchoring element can be released from the distal ends of the connecting legs. The support element comprises one or more spring elements (36) associated with the connecting legs and a stop surface (31*a*) for engagement with the upper side of the anchoring element. The one or more spring elements act to push the anchoring element from the underside away from the retaining lugs so as to bias the upper side of the anchoring element against the stop surface of the support element.

14 Claims, 3 Drawing Sheets

(56) References Cited

U.S. PATENT DOCUMENTS

| | | | |
|---|---|---|---|
| 4,460,299 A * | 7/1984 | Kowalski | 411/85 |
| 4,545,697 A * | 10/1985 | Verdenne et al. | 403/230 |
| 5,209,619 A * | 5/1993 | Rinderer | 411/85 |
| 5,489,173 A * | 2/1996 | Hofle | 411/85 |
| 7,905,694 B2 * | 3/2011 | van Walraven | 411/85 |
| 8,132,992 B2 * | 3/2012 | van Walraven | 411/85 |
| 8,277,158 B2 * | 10/2012 | Csik et al. | 411/111 |

OTHER PUBLICATIONS

International Search Report and Written Opinion dated Jan. 24, 2011 for priority NL 2004811.

Office Action in related Chinese Application No. 201180026448.5 dated May 6, 2014 with English Translation.

* cited by examiner

FASTENING UNIT

CROSS-REFERENCE TO RELATED APPLICATIONS

This application is a United States National Stage Application of International Patent Application Serial No. PCT/NL2011/050363, filed 26 May 2011, which claims the benefit of NL 2004811, filed 3 Jun. 2010, both herein fully incorporated by reference.

FIELD OF THE INVENTION

The present invention relates to a fastening unit for fastening an object to a profile element with a longitudinal slot, in particular a profile element of the type comprising sides extending in the longitudinal direction, a bottom which connects the sides, and an upper side, wherein the upper side is formed by a flange directed inwardly from each side, which flanges define between them the longitudinal slot, which fastening unit includes:
- an oblong metal anchoring element with an upper side and a lower side opposite the upper side, which anchoring element has a length which is greater than the width of the longitudinal slot of the profile element, and has such a width that the anchoring element with its longitudinal axis can be aligned with the longitudinal slot, introduced into the profile element and then turned in order to extend substantially transversely to the longitudinal slot and with its upper side to engage behind the flanges of the profile element, wherein the anchoring element furthermore has a bore passing through it for receiving a male fastening element for fastening the object to the profile element when the anchoring element is in its transverse position,
- a support element on the upper side of the anchoring element, which support element has a body connected to the anchoring element and having a central opening which is substantially coaxial with the hole in the anchoring element,
- a washer element associated with the support element, which in a mounted state of the fastening unit on the profile element engages the upper side of the profile element,
- wherein the connection between the support element and the anchoring element includes two or more connecting legs which are formed integrally with the body of the support element and extend each through an associated recess in the anchoring element, which recess for one connecting leg of the support element is formed as a slot-like recess which extends from the upper side to the lower side of the anchoring element and adjoins the through bore in the anchoring element, the connecting legs at their distal ends having a retaining lug for preventing that the anchoring element can be released from the distal ends of the connecting legs.

Such a fastening unit is known from for example EP 978 663. The known fastening unit has a support element including a body with diametrically extending arms and annular flange engaging means attached to the arms. The annular flange engaging means are constituted by two semicircular portions that are curved in such a way that its middle portion lies closer to the upper edge of the anchoring element than the portion adjoining the ends of the arms. In use the curved semi-circular portions engage the upper side of the flanges and when the anchoring element is introduced in the longitudinal slot of the profile element and turned to a transverse position, the semi-circular portions are deformed. The anchoring element is then due to the resiliency of the semi-circular portions pulled into engagement with the inner side of the flanges of the profile element.

The present invention has for an object to provide an alternative fastening unit.

BRIEF SUMMARY OF THE INVENTION

An object of the present invention includes providing a fastening unit with a support element adapted to fasten an object to a profile element, wherein the support element comprises one or more spring elements associated with the connecting legs and a stop surface for engagement with the upper side of the anchoring element, wherein the one or more spring elements act to push the anchoring element from the underside away from the retaining lugs so as to bias the upper side of the anchoring element against the stop surface of the support element.

When the fastening unit according to the invention is mounted on a profile element, the anchoring element is introduced in the longitudinal slot thereof between the flanges. Next, the fastening unit is turned towards a position in which the anchoring element extends substantially transversely to the longitudinal slot. The upper side of the anchoring element will engage the inner side of the flanges of the profile element and will thereby be pushed away from the stop surface. The spring element(s) associated with the connecting legs will cause the anchoring element to be pushed from below, such that the anchoring element is biased into engagement with the inner side of the flanges of the profile element. In this way the fastening unit can be mounted on a profile element and held in position in a preassembly state by means of the action of the spring element(s).

In one particular preferred embodiment of the fastening unit according to the invention, the support element has two connecting legs and the spring element comprises an annular member, which annular member rests at diametrically opposite sides thereof against the retaining lugs of the connecting legs, and which annular member has two substantially semi-circular portions which are curved in such a way that its middle portion engages the underside of the anchoring member. In this specific embodiment the semicircular portions of the annular member bias the anchoring element against the stop surface. When moving the anchoring member away from the stop surface, the curved semicircular portions will be deformed, which in reaction induces a spring force due to the resiliency of the semi-circular portions. Said spring force tends to push the anchoring back towards the stop surface, such that the upper side of the anchoring element is clamped against the inner side of the flanges.

In another particular preferred embodiment of the fastening unit according to the invention the spring element is constituted by the connecting legs or at least a resilient portion thereof and the support element furthermore comprises engagement limbs which extend from the distal ends of the connecting legs upward such that the end of the engagement limb remote from the connecting leg engages the underside of the anchoring element at a location which is spaced from the location where the associated connecting leg extends through the anchoring element, wherein the connecting legs or at least a resilient portion thereof is resiliently deformed when the anchoring element is pushed away from the stop surface of the support element. When the anchoring element is pushed away from the stop surface, the ends of the engagement limbs are pushed away. The engagement limbs are relatively stiff and will not deform significantly. However, due to the force applied on the ends of the limbs by the anchoring element and due to the distance of said ends relative to the legs extending through the anchoring element, a bending moment is applied to the legs. The resiliency of the legs or relevant portions thereof will in reaction counteract the bending moment and tend to move the limb ends back to their rest position and thus move the anchoring element towards the stop surface. Thus the upper side of the anchoring element is clamped against the inner side of the flanges.

In the fastening unit according to the invention the stop surface of the support element may be constituted by an underside of the body of the support element.

Further preferred embodiments are defined by the dependent claims and will be elucidated in the following description with reference to the drawing.

DETAILED DESCRIPTION OF PREFERRED EMBODIMENTS

Figure 1:
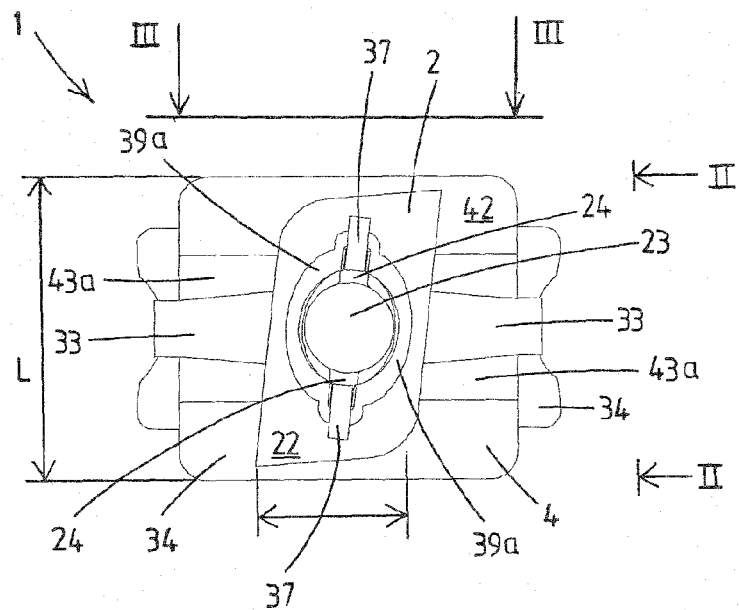
FIG. 1 shows a plan view from below of a first preferred embodiment of a fastening unit according to the invention.
Figure 2:
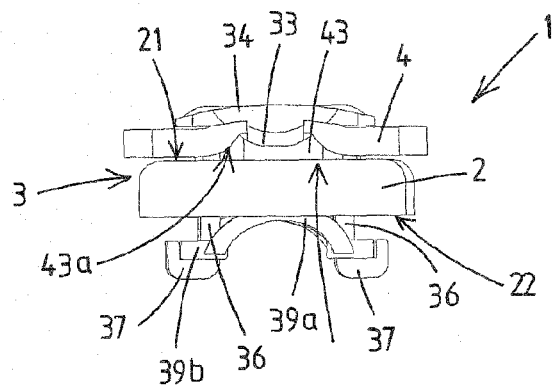
FIG. 2 shows a side elevational view in the direction II of the fastening unit of FIG. 1.
Figure 3:
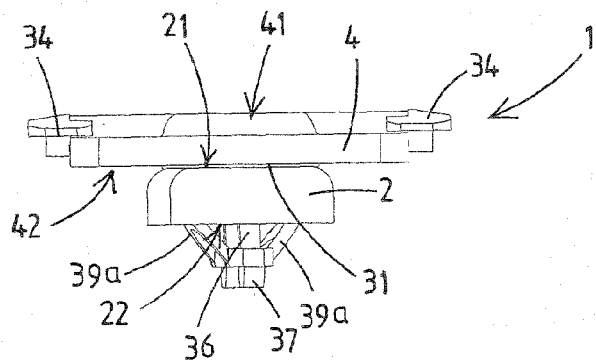
FIG. 3 shows a side elevational view in the direction III of the fastening unit of FIG. 1.
Figure 5:
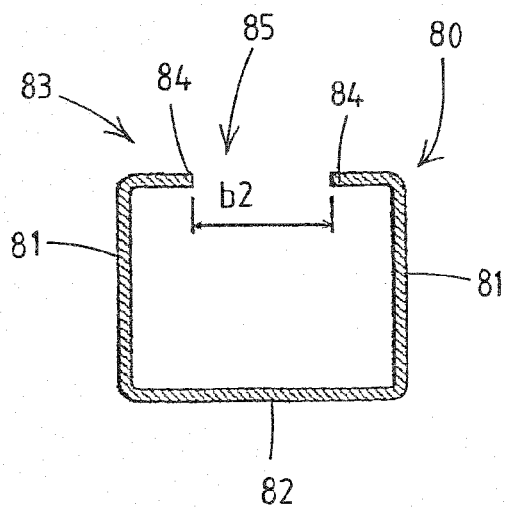
FIG. 5 shows a cross section of a profile element.

In FIGS. 1-3 is shown a fastening unit 1, which is intended to secure an object, such as for example a pipe clip, to a profiled-section element 80, a cross section of which is shown in FIG. 5.

The profile element 80 has two lateral sides 81 extending in the longitudinal direction, a base 82 which connects the lateral sides 81, and a top side 83. The top side 83 is formed by a flange 84 which is directed inwards from each lateral side 81. The flanges 84 between them delimit a longitudinal slot 85 of a width b2.

The fastening unit 1 comprises a metal anchoring element 2 with an oblong shape, a support element 3, and a washer 4, preferably also made of metal. The support element 3 is shown separately in FIG. 4 and is preferably made out of plastics material, preferably by means of injection moulding.

The anchoring element 2 has a top side 21 and an opposite underside 22. The anchoring element 2 is of a length L which is greater than the width b2 of the longitudinal slot 85 in the profile element 80. Furthermore, the width b1 of the anchoring element 2 is such that the anchoring element 2, as is generally known, with its longitudinal axis in line with the longitudinal slot 85, can be introduced into the profile element 80 through the longitudinal slot 85, and can then be rotated in order to extend substantially transversely with respect to the longitudinal slot 85, with its top side 21 engaging behind the flanges 84 of the profile element 80. In a variant which is not shown but is known per se from the prior art, the width of the anchoring element 2 may be slightly greater than the width b2 of the longitudinal slot 85, in which case the anchoring element 2, which has been positioned in line with the longitudinal slot 85, is then first of all pushed, in a tilted position, under one of the flanges 84 of the profile element 80.

Furthermore, the anchoring element 2 has a bore 23, preferably a threaded bore 23, passing through it for receiving a male fastening element, such as a bolt or a threaded rod for fastening the object to the profile element 80 when the anchoring element 2 is in its transverse position. In the preferred embodiment shown, the anchoring element 2 is provided with two cutouts 24 which, adjacent to the bore, extend through the nut 2 from the top side 21 to the underside 22. The cut-outs are 24 formed as slot-like recesses which adjoin the bore 23 at diametrically opposite sides.

The support element 3 is preferably made from a single piece of plastic by injection moulding. The support element 3 is arranged against the top side 21 of the anchoring element 2 and is connected to the latter in a manner which is to be described in more detail. The support element 3 has a body 31 with a central opening 32 which is substantially coaxial with the bore 23 in the anchoring element 2. The body 31 is preferably substantially in the shape of a circular ring, as shown in the figures, although it may also take other forms. The annular body 31 has an external diameter which is smaller than the width b2 of the longitudinal slot 85 in the profile element 80.

The support element 3 has two connecting legs 36 associated with the cutouts 24 adjoining the bore 23 in the anchoring element 2. The connecting legs 36 are received in the diametral cutouts 24, and in the exemplary embodiment shown are each provided with an outwardly facing protuberance which will be called retaining lugs 37. The retaining lugs 37 extend outwardly beyond the ends of the cutouts 24 such that the anchoring element 2 cannot be slided of the connecting legs 36, because the retaining lugs 37 hook behind the edge of the cutout 24 at the underside 22 of the anchoring element 2. Loss of the anchoring element 2 is thus prevented.

The support element 3 comprises furthermore two coupling arms 33, extending from the body 31 and having an end portion 34 gripping over the outer edge of the washer 4. The end portion thereto has two locking lugs 34a that engage the upper side of the washer 4. In the preferred embodiment the coupling arms 33 are integrally formed on the body 31 of the support element 3. The coupling arms 33 are extending from the body 31 of the support element 3 radially outward in a direction transverse to the longitudinal axis of the anchoring element 2 as can be seen in FIG. 1.

The washer 4 has a central hole 41 which is aligned with the central opening 32 in the body 31 of the support element 3 and the bore 23 in the anchoring element 2. The washer 4 bears against that side 31b of the body 31 of the support element 3 which faces away from the anchoring element 2. In the side facing towards the anchoring element 2, the washer 4 has an engagement surface 42 for engaging on the top side 83 of the profile element 80. In the preferred embodiment, the engagement surface 42 has a recess 43 with a section 43a for receiving the coupling arms 33 of the support element 3.

Figure 4:
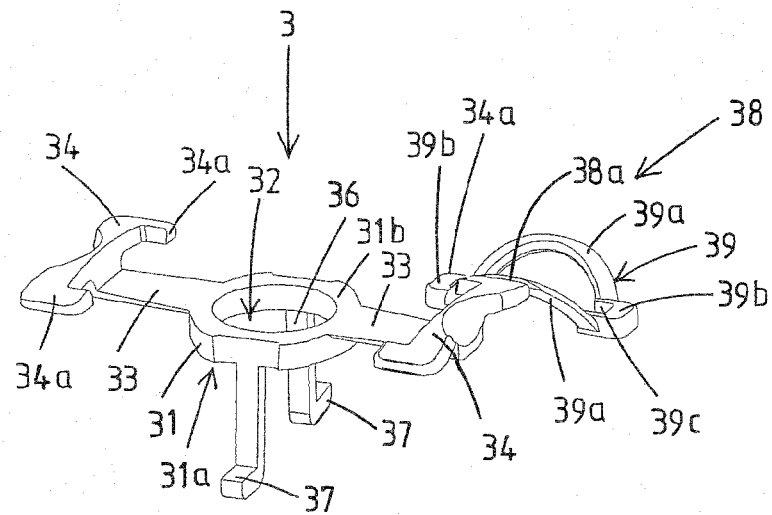
FIG. 4 shows in a view in perspective a support element with a spring element of the fastening unit of FIG. 1 as it comes out of an injection mould.

The support element 3 which is shown in FIGS. 1-4 has a spring element 38. This spring element is a separate part with respect to the remainder of the support element 3. In FIG. 4 is shown how the spring element 38 is connected to the end portion 34 of one of the coupling arms 33 of the support element 3. This connection is formed by a frangible connection 38a. In this way the two separate parts of the support element 3 can be produced in one single injection mould, which is advantageous in view of mould manufacturing and production costs. Moreover the spring element 38 cannot be lost before assembly of the fastening unit.

The spring element 38 comprises an annular member 39, which has two substantially semi-circular portions 39a which are curved. The annular member 39 has two connection portions 39b where the semicircular portions 39a are interconnected. Each connection portion 39b has a recess 39c in which a connection leg 36 of the support element 3 is received. In the assembled state of the fastening unit 1, the connection portions 39b of the annular member 38 rest on the retaining lugs 37 of the connecting legs 36. The semicircular portions 39a are curved in such a way that—in the assembled state of the fastening unit 1—the middle portions of the respective semicircular portions 39a engage the underside 22 of the anchoring element 2. Thus the anchoring element 2 is resiliently supported from below and is biased by the semicircular portions 39a of the spring element 38 against the surface 31a of the body 31 facing the anchoring element 2, which surface 31a is functioning as a stop surface.

When the fastening unit 1 is being assembled, the spring element 38 and the remainder of the support element are separated by rupturing the frangible connection 38a (cf. FIG. 4). The connecting legs 36 can then be pushed together sligthly such that the retaining lugs fit in the slot-like cutouts 24 adjoining the bore 23 in the anchoring element 2. The connecting legs 36 can then be inserted through the cutouts 24. When the retaining lugs 37 have passed through the cutouts 24 beyond the lower edge at the underside 22 of the anchoring element 2, the connecting legs 36 will resiliently spread back to their unloaded state, such that the retaining lugs 37 engage behind the edge at the ends of the cutouts 24. The connecting legs 36 are then moved further through the cutouts 24 until the underside 31a of the body 31 facing the anchoring element 2 abuts the upper side 21 of the anchoring element 2. In that position the retaining lugs 37 are located at distance from the underside 22 of the anchoring element 2. The connecting legs 36 can now be bended together again such that the extremities of the retaining lugs 37 are so close to each other that they fit through the opposite recesses 39c in the spring element 38. When the retaining lugs 37 have been passed through the recesses 39c to the underside of the connecting portions 39b of the spring element 38, the connecting legs 36 are released after which they spring back to their unloaded state and the retaining lugs 37 engage behind the lower edge of the recesses 39c. In that position the middle portions engage the underside 22 of the anchoring element 2, possibly with a pretension in them.

The washer 4 is attached to the support element 3 by pushing the end portions 34 of the coupling arms 33 downwardly in the direction of the anchoring element 2. Thereby the coupling arms 33 bend downwardly and the locking lugs 34a on the end portions 34 tilt. Thereby enough space is created to place the washer 4 from above on top of the body 31 of the support element 3. When the washer 4 is positioned on the body 31, the end portions 34 are released such that the coupling arms 33 bend back to their unloaded state and the locking lugs 34a engage over the outer edge of the washer 4 and lock the washer 4 in position.

Figure 6:
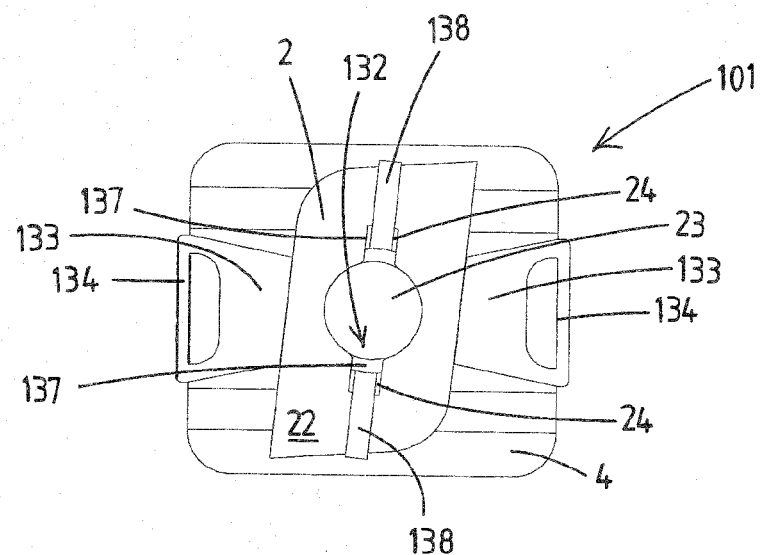
FIG. 6 shows a plan view from below from a second preferred embodiment of a fastening unit according to the invention.
Figure 7:
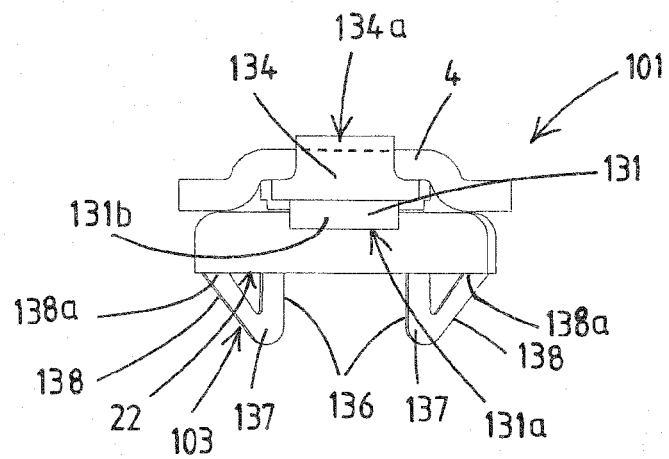
FIG. 7 shows a side elevational view of the fastening unit of FIG. 6.

In FIGS. 6 and 7 a fastening unit 101 is shown. This fastening unit 101 essentially has the same parts as the fastening unit 1 which is shown in FIGS. 1-4 and which has been described in the above. The washer 4 and the anchoring element 2 are essentially the same as the washer 4 and the anchoring element 2 in FIGS. 1-3. Corresponding parts of the washer and the anchoring element have been indicated in FIGS. 6 and 7 with the same reference numerals as in FIGS. 1-3. For a description of those common parts reference is made to the above description.

The fastening unit 101 has a support element 103. The support element 103 is preferably made from a single piece of plastic by injection moulding. The support element 103 is arranged against the top side 21 of the anchoring element 2 and is connected to the latter. The support element 103 has a body 131 with a central opening 132 which is substantially coaxial with the bore 23 in the anchoring element 2. The body 131 is preferably substantially in the shape of a circular ring, although it may also take other forms. The annular body 131 has an external diameter which is smaller than the width b2 of the longitudinal slot 85 in the profile element 80.

The body 131 of the support element 103 has on either side a protruding edge portion 131b which engage the longitudinal sides of the anchoring element 2.

The support element 103 comprises two coupling arms 133, extending from the body 131 and having an end portion 134 gripping over the outer edge of the washer 4. The end portion thereto has two locking lugs 134a that engage the upper side of the washer 4. In the preferred embodiment the coupling arms 133 are integrally formed on the body 131 of the support element 103. The coupling arms 133 are extending from the body 131 of the support element 103 radially outward in a direction transverse to the longitudinal axis of the anchoring element 2 as can be seen in FIG. 6.

The support element 103 has two connecting legs 136 associated with the cutouts 24 adjoining the bore 23 in the anchoring element 2. The connecting legs 136 are received in the diametral cutouts 24, and in the exemplary embodiment shown are each provided with an outwardly facing protuberance called a retaining lugs 137.

Engagement limbs 138 extend from the lugs 137 at the ends of the legs 136 upwardly and outwardly such that a distal end 138a of the engagement limb 138 remote from the connecting leg 136 engages the underside 22 of the anchoring element 2 at a location which is spaced from the location where the associated connecting leg 136 extends through the recess 24 in the anchoring element 2.

In use, when the anchoring element 2 is introduced in the longitudinal slot 85 of the profile element 80, and then turned to a transverse position with respect to the longitudinal axis of the profile element 80, the flange which engages the upper side 21 of the anchoring element 2 is pushed away from the stop surface on the underside of the body 131 of the support element 103. The distal ends 138a of the engagement limbs 138 are pushed downwards by the downwardly moving anchoring element 2. The engagement limbs 138 are relatively stiff and the load that the anchoring element 2 submits to the limbs 138 will be absorbed to a large extent in the longitudinal direction of the limbs, whereby the limbs 138 will not deform significantly. Due to the force applied on the ends 138a of the limbs 138 by the anchoring member 2 and due to the distance of said ends 138a relative to the legs 136 extending through the recesses 24 in the anchoring element 2, a bending moment is applied to the coupling legs 136. The resiliency of the coupling legs 136 or relevant portions thereof will in reaction counteract the bending moment and tend to move the limb ends 138a back to their rest position and thus move the anchoring element 2 towards the stop surface on the underside of the body 131 of the support element 103. Thus the upper side 21 of the anchoring element 2 is clamped against the inner side of the flanges 84.

When the fastening unit 101 is being assembled, the distal ends of the connecting legs 136 can be inserted in the slot like recesses 24 in the anchoring member 2. Due to the slanting orientation of the outer side of the lugs 137 and the slanting orientation of the limbs 138 with respect to the longitudinal axis of the connecting legs 136, the legs 136 will be bended towards each other. On the other hand, due to the acute angle between the legs 136 and the limbs 138, the limbs will be forced to make a more acute angle with the legs 136, or even, the limbs 138 will lie against the legs, thus substantially parallel with the legs 136. In this manner the legs 136 and limbs 138 can be pushed through the recesses 24, until the ends 138a of the limbs 138 have moved beyond the edge between the recesses 24 and the under side 22 of the anchoring element 2, the limbs 138 will flex outwardly and the connecting legs 136 will flex outwardly to their unloaded state, which is shown in FIG. 7

The washer 4 is placed on the upper side of the body 131 of the support element 103 in essentially the same manner as is described with reference to the embodiment of FIGS. 1-4.

The invention claimed is:

1. A fastening unit adapted to fasten an object to a profile element comprising:
   an anchoring element having an upper side and a lower side opposite the upper side;
   a support element on the upper side of the anchoring element;
   two connecting legs connecting a body of the support element and the anchoring element, each connecting leg having a retaining lug at a distal end;
   a spring element associated with the connecting legs; and
   a stop surface of the support element for engagement with the upper side of the anchoring element;
   wherein the spring element acts to push the anchoring element from the lower side away from the retaining lugs so as to bias the upper side of the anchoring element against the stop surface of the support element;
   wherein the profile element has sides extending in a longitudinal direction, a bottom that connects the sides, and an upper side, wherein the upper side is formed by a flange directed inwardly from each side, which flanges define between them a longitudinal slot having a width;
   wherein the anchoring element comprises an oblong metal anchoring element having a length that is greater than the width of the longitudinal slot of the profile element, and has such a width that the anchoring element with its longitudinal axis can be aligned with the longitudinal slot of the profile element, introduced into the profile element, and then turned to a transverse position relative to the longitudinal slot of the profile element, and with its upper side, to engage behind the flanges of the profile element, the anchoring element having a bore passing through it for receiving a male fastening element for fastening the object to the profile element when the anchoring element is in its transverse position;
   wherein the support element has a body, a central opening, and a washer element, the body connected to the anchoring element, the central opening substantially coaxial with the bore in the anchoring element, and the washer element engaging the upper side of the profile element when the fastening unit is in a mounted state on the profile element;
   wherein the two connecting legs are formed integrally with the body of the support element and extend each through an associated recess in the anchoring element, the recess adapted for one connecting leg of the support element being formed as a recess that extends from the upper side to the lower side of the anchoring element and adjoins the through bore in the anchoring element;
   wherein the spring element comprises an annular member, which annular member rests at diametrically opposite sides thereof against the retaining lugs of the connecting legs, and which annular member has two substantially semi-circular portions that are curved in such a way that its middle portion engages the underside of the anchoring member;
   wherein the retaining lugs prevent the anchoring element from being released from the distal ends of the connecting legs; and
   wherein the stop surface is constituted by an underside of the body of the support element.

2. The fastening unit according to claim 1, wherein the spring element and the remainder of the support element are separate parts.

3. The fastening unit according to claim 1, wherein the spring element and the support element are produced from plastics material in a single injection mould and—when taken out of the mould—are connected to each other by one or more frangible connections.

4. The fastening unit according to claim 1, wherein the annular member has two connection portions where the semi-circular portions are interconnected, wherein each connection portion has a recess in which a connection leg of the support element is received.

5. The fastening unit according to claim 4, wherein the recess in the connection portion adjoins the hole defined by the interconnected semi-circular portions of the annular member.

6. The fastening unit according to claim 4, wherein the connection portions rest on the retaining lugs of the connection legs of the support element.

7. The fastening unit according to claim 1, wherein the washer element comprises a metal washer that abuts the side of the body of the support element facing away from the anchoring element.

8. The fastening unit according to claim 7, wherein the locking means comprise coupling arms extending from the body and having an end portion gripping over the outer edge of the washer.

9. The fastening unit according to claim 8, wherein the coupling arms are integrally formed on the body of the support element.

10. The fastening unit according to claim 8, wherein the coupling arms are extending from the body of the support element radially outward in a direction transverse to the longitudinal axis of the anchoring element.

11. The fastening unit according to claim 1, wherein the washer element has an engagement surface on its side facing the anchoring member, in which engagement surface a recess is provided for receiving the coupling arms.

12. The fastening unit according to claim 1, wherein the body of the support element has an outer dimension such that, in use, it fits in the longitudinal slot of the profile element.

13. The fastening unit according to claim 1, wherein the stop surface of the support element is located at a distance from the engagement surface of the washer element, which distance is smaller than the thickness of the flanges of the profile element the fastening unit is to be used with.

14. The fastening unit according to claim 1, wherein the washer element abuts the side of the body of the support element facing away from the anchoring element and is held there by locking lugs associated with the support element.

* * * * *